United States Patent Office 3,480,690
Patented Nov. 25, 1969

3,480,690
NATURAL RUBBER CONTAINING n-ALKYL-
AMINE PHOSPHATE SALTS
Philip C. Kelley, Brecksville, Ohio, assignor to The B. F.
Goodrich Company, New York, N.Y., a corporation
of New York
No Drawing. Filed Dec. 14, 1967, Ser. No. 690,391
Int. Cl. C08c 11/66, 11/44
U.S. Cl. 260—814                                   5 Claims

ABSTRACT OF THE DISCLOSURE n-Alkylamine phosphate salts, such as n-dodecyl ammonium phosphate, are useful protective agents against oxidative degradation as promoted by manganese contaminants in natural rubber.

BACKGROUND OF THE INVENTION

The catalytic action of multivalent metals, such as copper, cobalt, manganese and iron, in promoting the oxidation of both vulcanized and unvulcanized rubbers upon aging is known. This prooxidant effect of metal compounds creates a serious problem in the shipment and storage of natural rubber, especially some of the poorer grades of natural rubber which often contain as high as 100 p.p.m. manganese and copper. These high levels of manganese and copper impurities are for the most part traceable to dirt, bark and other foreign materials which are picked up in the course of regular plantation operations. 100 p.p.m. manganese and/or copper can cause complete liquefaction of natural rubber, or as more frequenly is the case, the development of hot spots in the natural rubber bales during storage or shipment.

Stabilization of rubber and particularly of unvulcanized natural rubber against oxidative degradation as promoted by metal impurities is achieved through the use of complexing or chelating agents to "tie up" (coordinate) the metals. Complexing agents may be added to the rubber to be stabilized on the mill (U.S. Patent No. 2,667,522) or, in the case of water-insoluble complexing agents, directly to the rubber latex prior to the coagulation as taught in U.S. Patent No. 3,228,904. Although the chelating agents disclosed in U.S. Patent No. 3,228,904 afford excellent protection to natural rubber containing copper contamination, they are not effective against manganese contamination, in fact they even enhance the oxidation of manganese-containing natural rubber.

SUMMARY OF THE INVENTION

I have now found that n-alkylamine phosphate salts are useful protective agents for the stabilization of natural rubber against the oxidative effects of manganese contamination. In addition, the n-alkylamine phosphate salts of this invention are substantially insoluble in water and may therefore be added to an aqueous dispersion of the natural rubber or may be added to the rubber on a mill.

DETAILED DESCRIPTION

The complexing agents of the present invention useful for the protection of natural rubber against oxidative degradation are n-alkylamine phosphate salts having the formula $$[RN^+H_3][H_2PO_4^-]$$

wherein R is a straight chain hydrocarbon radical containing about 4 to 24 carbon atoms, and more preferably about 8 to 18 carbon atoms. Specific compounds of the above type include n-octyl ammonium phosphate, n-nonyl ammonium phosphate, n-decyl ammonium phosphate, n-undecyl ammonium phosphate, n-dodecyl ammonium phosphate, n-hexadecyl ammonium phosphate, n-octadecyl ammonium phosphate and the like.

The n-alkylamine phosphate salts are readily compatible with natural rubber and protect the natural rubber from manganese catalyzed oxidative degradation of the rubber. The n-alkylamine phosphate salts are not appreciably soluble in water and therefore are not subject to being extracted from the rubber upon washing. This feature renders these particular agents useful for addition directly to the natural rubber latex, since coagulation and subsequent rinsing of the coagulated rubber will not wash the n-alkylamine phosphate salt out of the rubber.

Organophosphrous compounds are widely disclosed in the literature as chelating and complexing agents. However, it was quite unexpected to find that the n-alkylamine phosphate salts of the present invention were useful in protecting manganese containing natural rubber based on the performance of other organophosphrous compounds. For example, trisubstituted phosphites such as phenyldidecyl phosphite showed little or no stabilization effect on natural rubber containing manganese contaminants, while n-octyl phosphite, n-octyl phosphate, and n-octyl phosphonic acid caused the formation of insoluble gel in the natural rubber.

In the practice of the present invention is is desirable to use from about 0.01 to about 5 parts by weight of the n-alkylamine phosphate salts per 100 parts by weight of natural rubber. More preferably about 0.1 to 2 parts per 100 parts of the rubber will be employed.

As a measure of the deterioration of natural rubber containing manganese contamination, the viscosity of the rubber is measured at regular intervals. As the rubber deteriorates the viscosity of the rubber decreases. The change in viscosity is reported as the degradation value (D.V.) obtained for a given aging time from the formula $$\text{D.V.} = \frac{8 \text{ minute Mooney viscosity after aging}}{\text{Original 8 minute Mooney viscosity}} \times 100$$

The Mooney viscosity is obtained at 212° F. using a large rotor.

To demonstrate the degradation of natural rubber when manganese contaminants are present, to 100 parts of No. 1 smoked sheet was added on a mill at 140° F. for 4 minutes 100 p.p.m. manganese, as manganese stearate. The manganese-containing natural rubber was milled at 140° F. into sheets of about 100 mil thickness and the sheets placed in an air-circulating oven maintained at 80° C. for aging. After aging for the desired time interval test samples were cut from the sheets. Results obtained for the natural rubber samples containing 100 p.p.m. added manganese are set forth in Table I. The initial increase in Mooney viscosity is attributed to oxidative cross-linking of the rubber, however, it is readily seen that after a relatively short aging time the effect of oxidative degradation is evident. Aging times above 240 hours produced liquefaction of the natural rubber sample containing 100 p.p.m. manganese and no protecting agents.

TABLE I

| Aging (hours) | 0 | 6 | 24 | 48 | 96 | 144 | 192 | 240 |
|---|---|---|---|---|---|---|---|---|
| Mooney viscosity (8 min) | 70 | 73 | 83 | 86 | 85 | 75 | 46 | 24 |
| D.V. percent | 100 | 104 | 118 | 123 | 121 | 108 | 66 | 34 |

To demonstrate the effectiveness with which the n-alkylamine phosphate salt protects the natural rubber from manganese, a portion of the above-described rubber containing 100 p.p.m. manganese was mixed with 1 part n-dodecyl ammonium phosphate per 100 parts natural rubber. The n-dodecyl ammonium phosphate was prepared by slowly adding 11.5 grams (0.1 mol) 85% phosphoric acid to a solution of 100 ml. diethyl ether and 8.5 grams (0.1 mol) n-dodecylamine with stirring. The n-dodecyl ammonium phosphate was recovered by evaporation of the solvent on a steam bath. The dried n-dodecyl ammonium phosphate was incorporated in the natural rubber by milling at 140° F. until a uniform dispersion was obtained. This stabilized natural rubber was aged and viscosity measurements made as described for the unprotected natural rubber. Test results for the natural rubber protected with the n-dodecyl ammonium phosphate are tabulated in Table II.

TABLE II

| Aging (hours) | 0 | 98 | 240 | 600 | 1,200 |
|---|---|---|---|---|---|
| Mooney viscosity (8 min.) | 52 | 52 | 48 | 43 | 45 |
| D.V. percent | 100 | 100 | 92 | 83 | 87 |

It is readily observed that the addition of the n-alkylamine phosphate salt markedly improved the oxidative stability of the manganese contaminated natural rubber. Similar improvements in the oxidative stability of natural rubber containing manganese in amounts up to 100 p.p.m. and even higher were achieved when n-octyl ammonium phosphate or n-hexadecyl ammonium phosphate was employed.

The n-alkylamine phosphate salts may be incorporated into the natural rubber on a mill or with any other suitable mixing device such as a Banbury mixer or internal kneader or by addition to the natural rubber latex followed by coagulation. They are compatible with other stabilizers and complexing or chelating agents and may be used in conjunction therewith to provide total protection for the natural rubber. For example, when 0.5 part n-dodecyl ammonium phosphate and 0.5 part of a stabilizer prepared in accordance with U.S. Patent No. 3,228,904 were added to 100 parts natural rubber containing 100 p.p.m. manganese and 25 p.p.m. copper, the degradation value of the rubber was 73% after 1200 hours aging in an air-circulating oven. The same rubber sample which was unstabilized had a degradation value less than 30% after only 24 hours.

The stabilizers of this invention are also compatible with other compounding ingredients which may be used for the subsequent preparation of the cured vulcanizates, such as fillers, reinforcing agents, pigments, plasticizers, antioxidants, antiozonants and the like. The n-alkylamine phosphate salts have a negligible effect on the scorch time and slightly speed the cure rate of the compounded natural rubber. The physical properties of the cured vulcanizates likewise show little or no effect because of the presence of the n-alkylamine phosphate salts and can be used for tire carcass stocks.

I claim:
1. A natural rubber composition resistant to manganese promoted oxidative degradation comprising a mixture of natural rubber and about 0.1 to about 5 parts by weight per 100 parts by weight of the natural rubber of an n-alkylamine phosphate salt having the formula

$$[RN^+H_3][H_2PO_4^-]$$

wherein R is a straight chain hydrocarbon radical containing from 4 to 24 carbon atoms.

2. The composition of claim 1, wherein the n-alkylamine phosphate salt has the formula $$[RN^+H_3][H_2PO_4^-]$$

and R is a straight chain hydrocarbon radical having from 8 to 18 carbon atoms.

3. The composition of claim 2, wherein the n-alkylamine phosphate salt is n-octyl ammonium phosphate.

4. The composition of claim 2, wherein the n-alkylamine phosphate salt is n-dodecyl ammonium phosphate.

5. The composition of claim 2, wherein the n-alkylamine phosphate salt is n-hexadecyl ammonium phosphate.

References Cited

UNITED STATES PATENTS 3,238,132   3/1966   Cyba _____ 260—814 XR

JOSEPH L. SCHOFER, Primary Examiner

WILLIAM F. HAMROCK, Assistant Examiner

U.S. Cl. X.R.

260—434